United States Patent Office 3,423,468
Patented Jan. 21, 1969

3,423,468
PROCESS FOR THE PRODUCTION OF
TERTIARY PHOSPHINES
Hermann Zorn, 4 Ploesslgasse, Vienna IV, Austria, Helmut Schindlbauer, Vienna, Austria, and Helmut Hagen, Ludwigshafen (Rhine), Germany; said Schindlbauer and said Hagen, assignors to said Zorn
No Drawing. Filed Feb. 16, 1965, Ser. No. 433,187
Claims priority, application Austria, Feb. 21, 1964,
A 1,518/64
U.S. Cl. 260—606.5      6 Claims
Int. Cl. C07f 9/50

ABSTRACT OF THE DISCLOSURE

This application discloses a process for the preparation of tertiary phosphines by the reaction of a secondary alkali metal phosphide with an alkali metal salt of an aromatic sulfonic acid. The reaction is carried out preferably in the presence of polar organic solvents in the absence of oxygen.

---

This invention relates to a process for the production of phosphines, particularly of tertiary phosphines.

The previously known processes for synthesizing tertiary phosphines are mainly based on the Grignard synthesis, that is, the reaction of alkali metal phosphides with alkyl or aryl halides or reactions of phosphorus halides with metallo-organic compounds, particularly aryl lithium compounds. The limits of the Grignard method are notorious: the number of aryl alkali metal compounds available is restricted. Moreover, the preparation of pure isomers of multi-halogenated aromatic substances is frequently difficult and may be accomplished only by time-consuming devious means.

This invention provides a new method which makes tertiary phosphines available in a simple manner. The process according to the invention resides in that alkali metal phosphides of the general formula

where R' and R" may be the same or different and each represent an alkyl or aryl radical and Me is an alkali metal, are reacted with alkali metal salts of aromatic sulfonic acids in the absence of oxygen.

The preparation of the alkali metal salts of aromatic sulfonic acids, which are used as starting material in the process of the invention, is simple and inexpensive. As contrasted to the unsatisfactory yield obtained by the known methods, the reaction according to the invention of alkali metal phosphides with alkali metal salts of aryl sulfonic acids gives high yields.

The production of alkali metal phosphides and the reaction according to the invention of the phosphides with aryl sulfonic acid salts may be carried out in the same reaction vessel.

In order to produce the alkali metal phosphide starting materials employed in the process of the invention one may use three methods, known per se, the choice depending on the starting materials which are more readily available in each case. The three methods are as follows:

(1) Direct reaction of secondary phosphines having any desired structure with elementary alkali metals (lithium, sodium, potassium) or conventional agents, such as n-butyl lithium, phenyl lithium or phenyl sodium;

(2) reaction of halogen phosphines with elementary alkali metals according to the general equations:

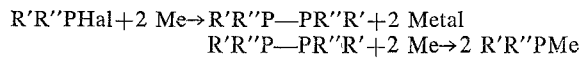
R″P—PR″R′+2 Me→2 R'R"PMe

In this case it is of advantage to disperse the metal in the solvent at a temperature which is higher than the melting point of the metal by means of a vibrator mixer and to add the halogen phosphine dropwise. The exothermic reaction heat generated thereby is sufficient to maintain the reaction mixture above the melting temperature of the alkali metal;

(3) decomposition of tertiary aryl or aralkyl phosphines by means of elementary alkali metals according to the general equation:

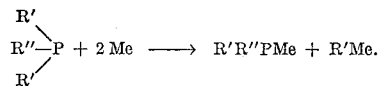

The reaction according to the invention of the alkali metal phosphides so obtained with alkali metal salts of aromatic sulfonic acids follows the equation:

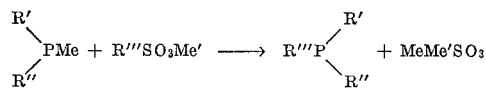

where R' and R" have the significance mentioned above, Me and Me' independently from each other each represent an alkali metal, particularly sodium, potassium or lithium, and R'" is an aryl radical. This reaction is a nucleophilic substitution of the sulfonic acid group by the R'R"P group. The success of the process is to a considerable degree influenced by two factors, namely, by the kind of solvent used and by the reaction temperature employed. By a suitable choice of the solvent and of the temperature used, differences in the reactivity of the aryl sulfonates may be compensated, and also less reactive sulfonates may be reacted almost quantitatively within a comparatively short time. It has been found that both the formation of the phosphide and the reaction of the phosphide with the aryl sulfonic acid salts proceed considerably faster in polar solvents than in non-polar solvents.

Examples of suitable solvents are: linear or cyclic ethers, such as di-n-butyl ether, tetrahydrofuran and dioxane, as well as dimethyl formamide and decaline. High-boiling ethers of diethylene glycol and triethylene glycol are particularly suitable. The alkali metal phosphides are soluble in tetrahydrofuran, dimethyl formamide and in glycol ethers. The reaction of the phosphides with aryl sulfonates may be carried out at temperatures ranging between 65 and 300° C. and should preferably be completed within 2 to 3 hours by choosing most favorable conditions. The reactions must be carried out with complete exclusion of oxygen.

The products obtained by the process of the invention may be used as catalysts, additives for lubricants, and as intermediate products.

The process of the invention is explained in more detail by the following examples.

EXAMPLE 1

Preparation of α-naphthyl-diphenyl-phosphine.

(a) To a suspension of 0.1 mole lithium diphenyl-phosphide (prepared from 18.6 parts by weight of diphenyl phosphine and 0.1 mole n-butyl lithium) in 300 parts by volume of dry di-n-butyl ether at room temperature there were added 23.1 parts by weight of α-naphthylene sulfonic acid sodium salt, and the reaction mixture was then heated at 140° C. for 18 hours under vigorous stirring and flushing with oxygen-free, dry nitrogen. Upon cooling, 200 parts by volume of water were added to the reaction mixture to remove the sulfite produced, the ether layer was separated, dried, and the solvent removed by distillation in a water-pump vacuum. The pasty distillation residue was recrystallized from methanol for purification to yield 16 parts by weight of pure white naphthyl diphenyl-phosphine. Yield: 51.5% of the theory; M.P. 124° C.

Characterization and analysis calcd. for $C_{22}H_{17}P$ (M.=312): P, 9.95%; C, 84.6%; H, 5.45%. Found: P, 9.8%; C, 84.3%; H, 5.41%.

This substance is soluble in ether, benzene, chloroform, and methyl acetate and less soluble in alcohol.

(b) 7.8 parts by weight of potassium were added at 60° C. to 300 ml. tetrahydrofuran and dispersed therein by means of a vibrator, and 21.5 parts by weight of diphenyl chloro-phosphine were added dropwise at such a rate that the reaction mixture was maintained at reflux. After approximately an hour the total of potassium metal was consumed and a deep-red solution of potassium diphenyl phosphide in tetrahydrofuran was obtained. Finally, 23 parts by weight of sharply dried α-naphthalene sulfonic acid sodium salt were added, and the reaction mixture was heated at 67° C. for 30 hours. After this period of time a pronounced brightening-up of the reaction mixture was observed. Upon hydrolysis with 100 ml. of aqueous ammonium chloride solution, the layers were separated with the aid of a separator funnel, and the ether phase was distilled. Then the distillation residue was purified with methanol to yield 14 parts by weight of α-naphthyl diphenyl-phosphine; M.P. 124–125° C. Yield: 45% of the theory.

(c) An analogous experiment, wherein β,β'-diethoxy-diethyl ether was employed as the solvent and a reaction temperature of 180° C. and a reaction time of 3 hours were used, produced a 75% yield of the pure product.

EXAMPLE 2

Preparation of β-naphthyl-diphenyl-phosphine.

To a dispersion of 7.8 parts by weight of potassium metal in β,β'-diethoxy-diethyl ether at 70° C. there were added dropwise 21.5 parts by weight of diphenyl chloro-phosphine. When the reaction was complete (disappearance of potassium metal and formation of a deep-red solution), 23 parts by weight of dry β-naphthalene sulfonic acid sodium salt were added, and the reaction mixture was heated at 180° C. for 3 hours. After this period of time the reaction mixture had assumed a light-brown colour. Upon hydrolysis and processing according to Example 1(b), the product, β-naphthyl-diphenyl-phosphine, was obtained. Yield: 68%; M.P. 117° C.

EXAMPLE 3

Preparation of 1,5-naphthylene-bis-diphenyl-phosphine.

(a) In 250 ml. of dry decaline 16 parts by weight of potassium metal were dispersed at 65° C. by means of a vibrator, whereupon the temperature was increased to 120° C. Then 46 parts by weight of diphenyl chloro-phosphine were added dropwise. The phosphine potassium salt precipitated as a brownish-red flaky solid.

Upon addition of 33 parts by weight of 1,5-naphthalene disulfonic acid sodium salt were added, the reaction mixture was heated at 175° C. for 24 hours. Then the reaction mixture was cooled to room temperature and hydrolyzed with 100 ml. of water, whereupon the reaction mixture was filtered to remove undissolved solids and the decaline layer was distilled in vacuo. Undissolved matter was extracted with chloroform, the chloroform was distilled, and the remainder combined with the residue from the decaline phase. Upon a treatment of the combined residues with methanol to dissolve the diphenyl phosphinic acid, the mixture was dissolved in benzene and treated with petroleum ether (boiling point interval 50–70° C. at atmospheric pressure). Upon cooling, a white, powdery precipitate of 1,5-naphthylene-bis-diphenyl-phosphine was obtained. Yield: 4.8 parts by weight=9.6% of the theory.

This product melts at 261° C.

Characterization and analysis calcd. for $C_{34}H_{26}P_2$ (M.=496): C, 82.3%; H, 5.25%; P, 12.45%. Found: C, 82.4%; H, 5.15%; P, 12.4%.

(c) 15.8 parts by weight of potassium metal were dispersed in 250 parts by volume of dry tetrahydrofuran at 65° C., and 46 parts by weight of diphenyl chloro-phosphine were added dropwise. When the reaction was complete, 33 parts by weight of 1,5-naphthalene disulfonic acid sodium salt were added, and the reaction mixture heated at 67° C. for 45 hours. Upon purification, 16 parts by weight of pure 1,5-naphthylene-bis-diphenyl-phosphine, i.e., 31% of the theory, were obtained.

(c) In an analogous experiment wherein triethylene glycol diethyl ether was employed as the solvent and a reaction temperature of 205° C. and a reaction time of 2½ hours were used, 1,5-naphthylene-bis-diphenyl-phosphine was obtained with a 90% yield.

EXAMPLE 4

Preparation of 2,7-naphthylene-bis-diphenyl-phosphine.

(a) 16 parts by weight of potassium metal were dispersed in 250 parts by volume of dry tetrahydrofuran at 65° C. by means of a vibrator mixer, and 46 parts by weight of diphenyl chloro-phosphine were added dropwise. Following addition of 33 parts by weight of 2,7-naphthalene disulfonic acid sodium salt, the mixture was heated at 67° C. for 45 hours. Then the mixture was processed according to Example 1(b) to yield 24 parts by weight of a solid white product. Yield: 48.5% of the theory. This product melts at 141° C. It is soluble in benzene, chloroform, ether and methyl acetate.

Characterization and analysis calcd. for $C_{34}H_{26}P_2$ (M.=496): P, 12.45%; C, 82.3%; H, 5.25%. Found: P, 12.3%; C, 81.1%; H, 5.30%.

EXAMPLE 5

Preparation of 2,6-naphthylene-bis-diphenyl-phosphine.

(a) In 400 parts by volume of dry dioxane 52 parts by weight of triphenyl phosphine were dissolved. Then 12 parts by weight of potassium metal were added in small portions, and the temperature was increased under stirring. At 60° C. the potassium metal melted, and a violent reaction commenced which caused the temperature of the reaction mixture to rise to the boiling point of dioxane within a short time. Then the reaction mixture was refluxed for another 2 hours. Upon cooling, the dioxane complex of the potassium diphenyl-phosphide, [$(C_6H_5)_2$ pK 2 dioxane], precipitated in the form of orange crystals. The solvent which contained dissolved non-reacted triphenyl phosphine and phenyl potassium, was removed by means of a submersible suction filter. The residual potassium diphenyl phosphide complex was dissolved in 250 parts by volume of dimethyl formamide to give a deep-red colour. Following addition of 23 parts by weight of 2,6-naphthalene sulfonic acid sodium salt, the reaction mixture was heated at 130° C. for 15 hours. After this period of time the mixture had decolorized. Upon cooling, the contents of the flask was filtered by means of suction. Then the filter cake was decocted with water, and the residue dissolved in benzene and precipitated with petroleum ether. In this manner 20 parts by weight of a solid white product having a melting point of 219–220° C. could be obtained. From the filtrate recovered from the cooled, decolorized reaction mixture there was obtained, upon removing the dimethyl formamide by distillation in a water pump vacuum, 5 g. of a substance which melted at 140° C. This product was 1,2-bis(diphenyl-phosphine)-ethane. The said compound was formed as a result of a secondary reaction in the decomposition of triphenyl phosphine with potassium in dioxane. The compound having a melting point of 219–220° C. was identified to be 2,6-naphthylene-bis-diphenyl-phosphine.

*Analysis.*—Calcd. for $C_{34}H_{26}P_2$ (M.=496): P, 12.5%. Found: P, 12.6%.

(b) 16 parts by weight of potassium metal were dispersed in 250 ml. β,β'-diethoxy-diethyl ether, and 46 parts by weight of diphenyl chloro-phosphine were added dropwise at a temperature of 100° C. When heated to 190° C. following an addition of 34 parts by weight of 2,6-naphthalene disulfonic acid sodium salt, the reaction mixture, which had originally been of a dark-red colour, decolorized within two hours. Upon processing according to Example 1(a) 35 parts by weight=71% of the theory of 2,6-naphthylene-bis-diphenyl-phosphine were obtained; M.P. 221° C.

This substance has a slightly lower solubility than the other di-tertiary naphthylene phosphines. It is, however, soluble in benzene, chloroform and butyl acetate under heating.

EXAMPLE 6

Preparation of 1-anthracene-diphenyl-phosphine.

A potassium diphenyl phosphide solution prepared in conventional manner by dissolving 16 parts by weight of potassium metal and 46 parts by weight of diphenyl chloro-phosphine in 200 ml. of dry tetrahydrofuran was reacted with 60 parts by weight of 1-anthracene sulfonic acid potassium salt.

With a reaction temperature of 67° C. and a reaction period of 5 hours 1-anthracene-diphenyl-phosphine was produced with an 80% yield.

This substance is a light-yellow, finely crystalline powder having a melting point of 194° C. It is soluble in benzene, chloroform, ether, and butyl acetate.

Calcd. for $C_{26}H_{19}P$ (M.=362): P, 8.55%; C, 86.2%; H, 5.25%. Found: P, 8.4%; C, 86.1%; H, 5.25%.

EXAMPLE 7

Preparation of 2-anthracene-diphenyl-phosphine.

The method was the same as described in Example 6, using the same quantitative proportions, and yielded the desired tertiary phosphine with an 68% yield.

2-anthracene-diphenyl phosphine is a slightly yellowish substance having a melting point of 157° C. It is soluble in benzene, ether, chloroform, and butyl acetate.

Calcd. for $C_{26}H_{19}P$ (M.=263): P, 8.6%. Found: P, 8.5%.

EXAMPLE 8

Preparation of 1,3-phenylene-bis-diphenyl-phosphine.

In 150 parts by volume of dry β,β'-diethoxy-diethyl ether 15.6 parts by weight of potassium were dispersed by means of a vibrator at 70° C., and 45 parts by weight of diphenyl chloro-phosphine were added dropwise. The resulting potassium diphenyl phosphide was reacted with 29 parts by weight of 1,3-benzene disulfonic acid sodium salt at a temperature of 185° C. After 3 hours the reaction mixture had assumed a light-yellow colour. Upon hydrolysis with aqueous ammonium chloride solution and separation of the layers, the organic layer was distilled in vacuo, and the residue was dissolved in benzene, shaken out with sodium hydroxide solution and again distilled.

The resulting phosphine is present, at room temperature, in the form of a tough, colourless oil. Yield: 30.5 parts by weight=69% of the theory.

Calcd. for $C_{30}H_{24}P_2$ (M.=446): P, 13.9%. Found: P, 14.0%.

EXAMPLE 9

Preparation of α-naphthyl-n-hexadecyl-n-butyl-phosphine.

32 parts by weight of n-hexadecyl-n-butyl-phosphine were metalled using a dispersion of 3.9 parts by weight of potassium metal in 200 parts by volume of tetrahydrofuran at 67° C. during 16 hours.

Addition of 22 parts by weight of α-naphthalene sulfonic acid sodium salt caused an exothermic reaction. The reaction mixture was maintained at a temperature of 67° C. for several hours. The usual hydrolytic treatment produced with an 84% yield a slightly greenish-yellow oil, which was identified to be α-naphthyl-n-hexadecyl-n-butyl-phosphine.

Calcd. for $C_{30}H_{49}P$ (M.=440): P, 7.05%. Found: P, 7.2%.

EXAMPLE 10

Preparation of 2-anthracen-tolyl-isobutyl-phosphine.

To a suspension of 7.8 parts by weight of potassium metal in 200 parts by volume of diethoxy-diethyl ether there were slowly added 18 parts by weight of tolyl isobutyl phosphine, and the reaction mixture was heated at 160° C. for 4 hours. Upon addition of 56 parts by weight of 2-anthracene sulfonic acid sodium salt the temperature was maintained at 160° C. (for about 10 hours) until decolorization was complete. Following an addition of 100 parts by volume of water to the reaction mixture, the ether layer was separated, dried, and the ether distilled. The residue consisted of 23.5 parts by weight of 2-anthracene-tolyl-isobutly-phosphine which was present in the form of a yellowish-brown oil. Yield: 66% of the theory.

Calcd. for $C_{21}H_{23}P$ (M.=356): P, 8.71%. Found: P, 8.67%.

What we claimed is:

1. A process for the production of tertiary phosphines comprising reacting alkali metal phosphides of the general formula

with an alkali metal salt of an aromatic sulfonic acid in the absence of oxygen, where R' and R" each represent a member of the group consisting of alkyl and aryl radicals, and Me is an alkali metal.

2. A process according to claim 1 wherein said radicals R' and R" are each independently selected from the group consisting of phenyl, n-hexadecyl, n-butyl, tolyl and i-butyl, and said sulfonic acid is selected from the group consisting of α-naphthalene sulfonic acid, β-naphthalene sulfonic acid, 1,5-naphthalene disulfonic acid, 2,7-naphthalene disulfonic acid, 2,6-naphthalene disulfonic acid, 1-anthracene sulfonic acid, 2-anthracene sulfonic acid and 1,3-benzene disulfonic acid.

3. A process according to claim 1 wherein said reaction is carried out in a polar organic solvent.

4. A process according to claim 2 wherein said reaction is carried out in the presence of a solvent selected from the group consisting of di-n-butyl ether, tetrahydrofuran, dioxane, dimethyl formamide, decaline, diethylene glycol, triethylene glycol, β,β'-diethoxy diethyl ether, triethylene glycol diethyl ether.

5. The proces set forth in claim 1, wherein the reaction is carried out in the presence of solvents which are chemically indifferent to the reaction mixture.

6. The process set forth in claim 5, wherein the reaction is carried out in a high-boiling ether solvent.

References Cited

UNITED STATES PATENTS 2,437,795    3/1948   Walling _____ 260—606.5

TOBIAS E. LEVOW, *Primary Examiner.*

W. F. W. BELLAMY, *Assistant Examiner.*